United States Patent [19]
Christiansen et al.

[11] Patent Number: 6,159,530
[45] Date of Patent: Dec. 12, 2000

[54] CEREAL GRAINS FORTIFIED WITH AMINO ACID CHELATES AND PROCESS OF MAKING

[75] Inventors: Earl C. Christiansen, S. Ogden; Stephen D. Ashmead, Clinton, both of Utah

[73] Assignee: Albion International, Inc., Clearfield, Utah

[21] Appl. No.: 09/336,878

[22] Filed: Jun. 18, 1999

[51] Int. Cl.[7] .............................. A23L 1/10; A23L 1/164; A23L 1/18

[52] U.S. Cl. ........................... 426/656; 426/74; 426/512; 426/519; 426/618; 426/619; 426/620; 426/621

[58] Field of Search ................ 428/74, 656, 618, 428/619, 620, 621, 512, 519

[56] References Cited

U.S. PATENT DOCUMENTS

| | | |
|---|---|---|
| 1,575,762 | 9/1926 | Hoffman . |
| 2,345,571 | 4/1944 | Briod . |
| 2,775,521 | 12/1956 | Mateles . |
| 3,767,824 | 10/1973 | Keyser . |
| 4,020,158 | 4/1977 | Ashmead et al. . |
| 4,167,564 | 9/1979 | Jensen . |
| 4,216,143 | 8/1980 | Ashmead . |
| 4,216,144 | 8/1980 | Ashmead . |
| 4,478,857 | 10/1984 | Stauss . |
| 4,599,152 | 7/1986 | Ashmead . |
| 4,725,427 | 2/1988 | Ashmead et al. . |
| 4,774,089 | 9/1988 | Ashmead . |
| 4,830,716 | 5/1989 | Ashmead . |
| 4,863,898 | 9/1989 | Ashmead et al. . |
| 5,250,308 | 10/1993 | Alexander et al. . |
| 5,534,275 | 7/1996 | Humbert et al. ............ 426/74 |

*Primary Examiner*—Helen Pratt
*Attorney, Agent, or Firm*—Thorpe, North & Western, LLP

[57] ABSTRACT

A composition and method of making a processed cereal piece fortified with a metal amino acid chelate is disclosed and described. A processed cereal piece and one or more metal amino acid chelates may be combined by either 1) admixing the metal amino acid chelate(s) into the dough, flour or other precursor prior to toasting and/or otherwise cooking; and/or 2) coating the processed cereal piece with the metal amino acid chelate(s).

59 Claims, No Drawings

CEREAL GRAINS FORTIFIED WITH AMINO ACID CHELATES AND PROCESS OF MAKING

FIELD OF THE INVENTION

The present invention is directed to processed cereal grains or pieces fortified with one or more mineral amino acid chelates and a method of making the same. Preferred embodiments include flaked pieces, puffed cereal grain kernels, puffed dough pieces, extruded dough pieces, baked pieces, nuggets and rolled grain pieces, any of which may be fortified with an amino acid chelate that is stable, palatable and highly bioavailable.

BACKGROUND OF THE INVENTION

Processed cereals have been made for many years. In fact, corn flakes were first made by health enthusiasts as early as the late nineteenth century in Battle Creek, Mich. Additionally, minimally processed grain cereals including oats, corn, wheat and rice have been used for breakfast meals as well, e.g., oatmeal. More recently, puffed processed cereals made from both dough and grains as well as baked processed cereals such as cookie based processed cereals have also been made.

A method of making flaked processed cereals such as corn flakes is as follows. First, corn kernels are selected to meet minimum requirements. Considerations such as color (yellow), moisture and lack of the presence of contaminants are all considered. For example, kernels that have sprouted, are moldy, diseased or otherwise damaged are generally rejected. The selected corn kernels are then steamed to soften the grain so that the germ and husk may be removed. The remaining portion or grit is then cooled and dried. Raw grit is placed in a pressure cooker where vitamins, niacin, riboflavin, thiamin, minerals such as iron or other additives are included. Preservation of iron additives is especially important because much iron is lost in the processing of the corn kernels. The grits are passed through a dryer to reduce moisture. The moist warm flakes are then milled and toasted for a few minutes until crisp in texture and golden brown in color. The flakes are then cooled and packaged.

Another variation of the method stated above involves the step of adding vitamins, minerals, etc., to milled grains themselves. Under those conditions, the grain flour and vitamin/mineral powders are mixed together and the blend is hydrated for baking. In both of the aforementioned methods, the vitamins and minerals are incorporated throughout the flakes. However, providing a mineral coating for processed cereals is another possible way to fortify processed cereals. One reason this technique is not as popular is that there are some practical limitations to using a coating compared to admixing vitamins/minerals into the flour or dough used to make the flakes. Vitamins and minerals that are admixed into the flakes are better protected, there is better dispersion and there is less of a chance that the vitamins and minerals will be washed away by mixing the coated cereal with milk prior to consumption.

A method of preparing puffed grain processed cereals is as follows. Grains, such as wheat, are selected based upon size, moisture percentage, protein content and lack of the presence of contaminants. The grain is then cleaned to remove unwanted contaminants. The essence of puffing is to gelatinize the starch present in the grain in a hot pressure chamber and then suddenly release the pressure. This causes the grain to expand to several times i-s original size. The pressure chamber is sometimes referred to as the "gun" and releasing the pressure is sometimes referred to as "firing the gun." The expanded grain, also known as "berries," are separated from loose or broken kernels. To the berries, vitamins and other minerals are then added. The fortified berries are hot air oven dried to reduce the moisture and to obtain a predetermined puffed grain size.

Puffed dough processed cereals or other extruded grain dough cereals are made in a similar manner to the aforementioned methods. First, dry ingredients, including vitamins and minerals, are hydrated into a flowable paste. The dough or paste is placed in an extruder where it is put under heat and pressure. Dies are used to shape the dough. Air may optionally be injected if a lighter or less dense processed cereal puff is desired. For example, Cheerios® are a heavier oat dough puffed processed cereal and Rice Crispies® are a lighter rice dough puffed processed cereal. Further, other extruded dough cereals include such things as nuggets which are more dense and shredded wheats.

Fortification of processed cereals is also well known in the art. As mentioned, such items as vitamins, minerals, niacin, riboflavin, fiber, thiamin and other additives may be included. These fortificants may be added in various ways. First, heat tolerant vitamins may be incorporated into the processed cereal dough prior to cooking and second, heat sensitive or heat labile vitamins may be sprayed onto the finished processed cereal product after pelleting/shaping, drying and/or toasting. Either method and resulting processed cereal piece may be desirable depending upon the application.

In order to topically apply vitamins, a group of desired vitamins and/or minerals are pre-mixed and dissolved into a solution. The solution is then sprayed onto the respective processed flaked pieces, puffed cereal grain kernels, puffed dough pieces, extruded dough pieces, baked pieces, nuggets, rolled grain pieces, etc. By spraying the vitamin/mineral solution onto the various processed cereal pieces after the steps of drying, toasting, baking, etc., degradation of heat sensitive vitamins is prevented. However, topical application of a vitamin solution has disadvantages as well. A processed cereal is more likely to be unpalatable when topical vitamin/mineral coatings are applied. As such, attempts have been made to mask this unpalatable flavor by applying a frosting coating subsequent to the vitamin/mineral coating. However, this process may actually dilute the vitamin/mineral content of the previous coating. Examples of processes for topical application include: U.S. Pat. No. 5,250,308 which discloses a method and product resulting from topical application of fiber to foodstuff such as puffed snack products; U.S. Pat. No. 3,767,824 which discloses a method of coating processed cereal products with vitamins; and U.S. Pat. No. 2,775,521 which discloses a method for fortifying grain products with dry mixtures of vitamins and minerals using a coating process.

Conversely, heat tolerant vitamins may be incorporated into processed cereal dough prior to cooking by admixing dry vitamins and/or minerals with milled grains. In U.S. Pat. No. 4,478,857, a process of making nutrient fortified cereal based food is disclosed. In that disclosure, processed cereal grains are milled to a fine flour and then are admixed with vitamins and minerals in excess of recommended daily requirements. The vitamin/mineral enriched flour is then hydrated in preparation of being cooker extruded. There, gelatinization occurs where the processed cereal is shaped/sized and dried. The result is not only a vitamin enriched processed cereal, but a shelf stable product as well. Other patents using similar technology include: U.S. Pat. No. 2,345,571 which discloses processes for producing a vitamin fortified dry product by adding a fat soluble vitamin to composition to an aqueous slurry of vegetable material; and U.S. Pat. No. 1,575,762 which discloses a method of adding dry vitamins to bread dough.

Next, turning to alternative fortificants, the use of chelates, particularly amino acid chelates, is an effective way to increase bioavailability in warm blooded hosts. The term "chelate" has often been misunderstood or applied in a general or catch-all fashion. A chelate is a definite structure resulting from precise requirement of synthesis. Proper conditions must be present for chelation to take place, including proper mole ratios of ligands to metal ions, pH and solubility of reactants. For chelation to occur, all components should be dissolved in solution and either be ionized or of appropriate electronic configuration in order for coordinate covalent bonding between the ligand and the metal ion to occur.

Chelation can be confirmed and differentiated from mixtures of components by infrared spectra through comparison of the stretching of bonds or shifting of absorption caused by bond formation. As applied in the field of mineral nutrition, there are two allegedly "chelated" products which are commercially utilized. The first is referred to as a "metal proteinate." The American Association of Feed Control officials (AAFCO) has defined a "metal proteinate" as the product resulting from the chelation of a soluble salt with amino acids and/or partially hydrolyzed protein. Such products are referred to as the specific metal proteinate, e.g., copper proteinate, zinc proteinate, etc. This definition does not contain any requirements to assure that chelation is actually present. On the basis of the chemical reactant possibilities, there are some real reservations as to the probability of chelation occurring to any great degree. For example, the inclusion of partially hydrolyzed proteins as suitable ligands and the term "and/or" in reference to such ligands implies that products made solely from partially hydrolyzed protein and soluble salts would have the same biochemical and physiological properties as products made from combining amino acids and soluble metal salts. Such an assertion is chemically incorrect. Partially hydrolyzed protein ligands may have molecular weights in the range of thousands of daltons and any bonding between such ligands and a metal ion may be nothing more than a complex or some form of ionic attraction, i.e., the metal drawn in close proximity to carboxyl moiety of such a ligand.

While some products marketed as metal proteinates during the 1960's and 1970's may have been chelates, this was prior to the adoption of the AAFCO definition. An analysis of products currently marketed as metal proteinates reveals that most, if not all, are mixtures of metal salts and hydrolyzed protein or complexes between metal salts and hydrolyzed protein. Most are impure products which are difficult to analyze and are not consistent in protein make-up and/or mineral content.

The second product, referred to as an "amino acid chelate," when properly formed, is a stable product having one or more five-membered rings formed by reaction between the carboxyl oxygen, and the α-amino group of an α-amino acid with the metal ion. Such a five-membered ring is defined by the metal atom, the carboxyl oxygen, the carbonyl carbon, the a-carbon and the α-amino nitrogen. The actual structure will depend upon the ligand to metal mole ratio. The ligand to metal mole ratio is at least 1:1 and is preferably 2:1 but, in certain instances, may be 3:1 or even 4:1. Most typically, an amino acid chelate may be represented at a ligand to metal ratio of 2:1 according to the following formula:

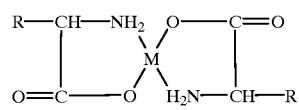

(Formula I)

In the above formula, when R is H, the amino acid is glycine which is the simplest of the α-amino acids. However, R could be representative of any other of the other twenty or so naturally occurring amino acids derived from proteins. These all have the same configuration for the positioning of the carboxyl oxygen and the α-amino nitrogen. In other words, the chelate ring is defined by the same atoms in each instance. The American Association of Feed Control Officials (AAFCO) have also issued a definition for an amino acid chelate. It is officially defined as the product resulting from the reaction of a metal ion from a soluble metal salt with amino acids with a mole ratio of one mole of metal to one to three (preferably two) moles of amino acids to form coordinate covalent bonds. The average weight of the hydrolyzed amino acids must be approximately 150 and the resulting molecular weight of the chelate must not exceed 800. The products are identified by the specific metal forming the chelate, e.g., iron amino acid chelate, copper amino acid chelate, etc.

The reason a metal atom can accept bonds over and above the oxidation state of the metal is due to the nature of chelation. In Formula I, it is noted that one bond is formed from the carboxyl oxygen. The other bond is formed by the α-amino nitrogen which contributes both of the electrons used in the bonding. These electrons fill available spaces in the d-orbitals. This type of bond is known as a dative bond or a coordinate covalent bond and is common in chelation. Thus, a metal ion with a normal valency of +2 can be bonded by four bonds when fully chelated. When chelated in the manner described the divalent metal ion, the chelate is completely satisfied by the bonding electrons and the charge on the metal atom (as well as on the overall molecule) is zero. This neutrality contributes to the bioavailability of metal amino acid chelates.

Amino acid chelates can also be formed using peptide ligands instead of single amino acids. These will usually be in the form of dipeptides, tripeptides and sometimes tetrapeptides because larger ligands have a molecular weight which is too great for direct assimilation of the chelate formed. Generally, peptide ligands, will be derived by the hydrolysis of protein. However, peptides prepared by conventional synthetic techniques or genetic engineering can also be used. When a ligand is a di- or tripeptide a radical of the formula $[C(O)CHRNH]_e$ H will replace one of the hydrogens attached to the nitrogen atom in Formula I. R, as defined in Formula I, can be H, or the residue of any other naturally occurring amino acid and e can be an integer of 1, 2 or 3. When e is 1 the ligand will be a dipeptide, when e is 2 the ligand will be a tripeptide and so forth.

The structure, chemistry and bioavailability of amino acid chelates is well documented in the literature, e.g. Ashmead et al., Chelated Mineral Nutrition, (1982), Chas. C. Thomas Publishers, Springfield, Ill.; Ashmead et al., Intestinal Absorption of Metal Ions, (1985), Chas. C. Thomas Publishers, Springfield, Ill.; Ashmead et al., Foliar Feeding of Plants with Amino Acid Chelates, (1986), Noyes Publications, Park Ridge, N.J.; U.S. Pat. Nos. 4,020,158; 4,167,564; 4,216,143; 4,216,144; 4,599,152; 4,774,089; 4,830,716; 4,863,898 and others. Further, flavored effervescent mixtures of vitamins and amino acid chelates for administration to humans in the form of a beverage are disclosed in U.S. Pat. No. 4,725,427.

One advantage of amino acid chelates in the field of mineral nutrition is attributed to the fact that these chelates are readily absorbed in the gut and mucosal cells by means of active transport as though they were solely amino acids. In other words, the minerals are absorbed along with the amino acids as a single unit utilizing the amino acids as carrier molecules. Therefore, the problems associated with the competition of ions for active sites and the suppression of specific nutritive mineral elements by others are avoided. This is especially true for compounds such as iron sulfates that must be delivered in relatively large quantities in order for the body to absorb an appropriate amount. This is significant because large quantities often cause nausea and other discomforts as well as create an undesirable taste.

In view of the foregoing, it would be useful to provide a processed cereal grain or piece fortified with an amino acid chelate and method of making the same by either incorporating one or more mineral amino acid chelates throughout a processed cereal piece or by coating a processed cereal piece topically.

OBJECTS AND SUMMARY OF THE INVENTION

It is an object of the present invention to provide a processed cereal piece fortified with one or more metal amino acid chelates wherein the metal source is highly bioavailable to the consuming host.

It is another object of the present invention to provide a processed cereal piece that has a metal amino acid chelate incorporated within the fabric of the flour, paste or dough prior to toasting or otherwise cooking the processed cereal piece.

Still another object of the present invention is to provide a processed cereal piece that is coated with a metal amino acid chelate.

Still another object of the present invention is to provide a palatable processed cereal piece that is fortified with a metal amino acid chelate.

Yet another object of the present invention is to provide a method for fortifying processed cereal pieces, including flaked pieces, puffed cereal grain kernels, puffed dough pieces, extruded dough pieces, baked pieces, nuggets, rolled grain pieces, etc., with metal amino acid chelates.

These and other objects may be accomplished by combining metal amino acid chelates with processed cereals so that the result is a processed cereal piece that is fortified by one or more amino acid chelates. Whether the amino acid chelate is incorporated throughout the processed cereal grain prior to cooking or is applied as a topical coating, the invention is drawn toward the combination of an amino acid chelate and a processed cereal piece. A processed cereal piece fortified with one or more metal amino acid chelates is desirable because metal amino acid chelates are absorbed through the gut and mucosal cells as intact molecules via active transport and may subsequently be transported to various tissues so that the minerals, i.e., metals, and/or ligands may be used by the body as needed.

DETAILED DESCRIPTION OF THE INVENTION

Before the present invention drawn toward a processed cereal grain fortified with amino acid chelates and methods of making the same is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

"Processed cereal piece" or "processed cereal grain" refers to any cereal food that is processed prior to consumption including flaked pieces, puffed cereal grain kernels, puffed dough pieces, extruded dough pieces, baked pieces, nuggets and rolled grain pieces. Each of the above mentioned categories have many different processed cereal pieces within each respective category.

"Integrated" as used herein refers to the combination of a processed cereal piece and an amino acid chelate, whether an amino acid chelate is incorporated throughout the dough or grain prior to cooking or whether the processed cereal piece is topically coated with an amino acid chelate. In either case, the fortified processed cereal piece undergoes minimal or undetectable color change and is stable for long periods of time, often as long as the shelf life of the processed cereal piece itself.

An "mineral amino acid chelate" or "metal amino acid chelate" is typically defined by coordinate covalent bonds between the metal being chelated and both the carboxyl oxygen group and the α-amino group of the amino acid. As such, a heterocyclic ring is formed with the metal as the closing member. However, as the pH level lowers, the bond between the carboxyl oxygen and the metal closing member becomes less covalent and more ionic, though there may still be a ring structure present. Therefore, an amino acid chelate for purposes of the present invention pertains to any chelate or complex comprised of an amino acid and a metal forming a ring structure.

As used herein, "taste free," "palatable" or "improved palatability" includes processed cereal grains that are substantially lacking metallic aftertaste. In other words, the processed cereal grains fortified with amino acid chelates of the present invention have a limited or no taste to a consuming warm-blooded host when compared to unfortified processed cereals. This is not to say that the processed cereal pieces of the present invention are completely lacking in flavor or taste. Further, there are minimal or no rancidity or oxidation issues interfering with the taste of the fortified processed cereal pieces.

"Bioavailable" means that the mineral/metal source of a processed cereal piece of the present invention is in an amino acid chelated form which is capable of being transported into to the blood stream via active transport.

With this in mind, the present invention is directed toward a composition and method of making a processed cereal piece fortified with a metal amino acid chelate having a ligand to metal ratio from 1:1 to 4:1. In the present invention, a processed cereal piece and one or more metal amino acid chelates may be combined or integrated by either (1) admixing the metal amino acid chelate(s) into the dough, flour or other precursor prior to toasting and/or otherwise cooking; and/or (2) coating a processed cereal piece with the metal amino acid chelate(s). In either case, whether admixed prior to cooking or coated after cooking (or both), the metal amino acid chelate is deemed integrated creating a processed cereal piece that is fortified with one or more amino acid chelates.

The metal amino acid chelate used to fortify the processed breakfast cereal piece is comprised of two components, a ligand or ligands and a metal. The ligand is one or more of the naturally occurring amino acids including alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine or valine. Further, ligands such as dipeptides, tripeptides and tetrapeptides formed by any combination of the aforementioned amino acids may also be used. Second, metals for use as closing members of the amino acid chelate ring include, but are not limited to, iron, calcium, magnesium, zinc, copper, manganese and/or chromium. Depending on what metal is used to fortify the various processed cereal pieces, the metal should be present in or on the various pieces at from about 0.001% to 2% by weight. For example, calcium will be present closer to the upper limit of this range, i.e., from about 0.05% to 2.0% by weight, and zinc and iron will be present closer to the lower limit of this range, i.e., from about 0.001% to 0.1% by weight.

A preferred embodiment is a processed cereal piece fortified with an amino acid chelate comprised of glycine and iron at a 2:1 ligand to metal ratio (ferrous bisglycinate). Though this is one preferred embodiment, all functional metal amino acid chelates are contemplated by the present invention as long as they are integrated with a processed cereal piece. Further, it is to be noted that any type of processed cereal piece may be fortified. For example, flaked pieces, puffed cereal grain kernels, puffed dough pieces, extruded dough pieces, baked pieces, nuggets, rolled grain pieces, etc., may all be fortified utilizing either a coating method or a method of admixing chelates into various flours, blends, doughs, pastes, etc., prior to toasting, roasting, baking or otherwise cooking. By using the metal amino acid chelates as described, the processed cereal pieces are palatable and suitable for ingestion.

Regarding the processed cereal grain pieces themselves, there are many methods of making many different processed cereals. By either coating processed cereals with metal amino acid chelates, admixing metal amino acid chelates within the dough, flour, etc. or both, the present invention falls within the scope of these processed cereal making methods. As such, the principals discussed as to fortifying processed cereals with metal amino acid chelates generally will apply to all processed flaked pieces, puffed cereal grain kernels, puffed dough pieces, extruded dough pieces, baked pieces, nuggets and rolled grain pieces.

The general method of fortifying a processed cereal piece with a metal amino acid chelate is as follows. First, a metal amino acid chelate must be provided. Second, a known amount of the metal amino acid chelate must be integrated into the processed cereal piece. The integration can either occur prior to or after toasting, baking or otherwise cooking, i.e., admixing with flour or dough prior to cooking and/or coating.

If fortifying the processed cereal pieces by admixing the metal amino acid chelate with the flour or dough, the following steps should be followed. First, the raw ingredients including the metal amino acid chelate should be dry blended to form a metal enriched blend or flour. Second, the blend should be hydrated to form a flowable paste or dough. Finally, the paste or dough should be shaped/sized in preparation for drying, toasting, roasting or otherwise cooking. This process is applicable to flaked pieces, puffed cereal grain kernels, puffed dough pieces, extruded dough pieces, baked pieces, nuggets and rolled grain pieces. This process may also be modified accordingly depending on the specific procedures used to make the various processed cereal pieces.

If fortifying the processed cereal pieces by coating with a metal amino acid chelate, the following steps should be followed. First, the metal amino acid chelate should be dry blended with a sugar or dextrose to form a blend. Next, the blend is mixed with water until a homogenous solution is formed. The aqueous chelate solution is then sprayed onto the pieces until adequately coated followed by a drying step. Other possible coating methods may include immersing the processed cereal piece in a solution or brushing the solution onto the processed cereal piece. The coated processed cereal pieces are then ready for consumption. Again, this process is applicable to flaked pieces, puffed cereal grain kernels, puffed dough pieces, extruded dough pieces, baked pieces, nuggets and rolled grain pieces and may be modified accordingly depending on the specific procedure used to make the various processed cereal pieces.

An additional step may be necessary when fortifying processed cereal pieces. It may be desired to premix fortified processed cereal pieces with unfortified processed cereal pieces at a ratio that will provide an adequate amount of metal amino acid chelate in a single serving of the now blended cereal pieces to meet the minimum daily requirement for the particular metal.

EXAMPLES

Example 1

Fortified oven baked cereal rice is prepared by mixing 100 pounds of medium rice with 8 pounds of table sugar (sucrose), 2 pounds of table salt (NaCl), 2 pounds of malt syrup and sufficient water to obtain a 28% moisture content. The mixture is cooked in a pressurized batch cooker for 1 hour at 15–18 psi. The rice mixture is then conveyed to smoothing wheels where it is allowed to cool. The rice mixture is then run over a drum dryer until the moisture is decreased from 28% to 17% and then is tempered at room temperature for 6 hours. The rice is bumped on flaking rolls and dried a second time down to 10% moisture. Next, the rice is baked at 600° F. for 90 seconds, conveyed through flaking wheels and spread into a thin layer. It is here that a continuous coating spray consisting of 10 pounds of water, 3 pounds of table sugar, a 2 ounce vitamin blend and 35 grams of ferrous bisglycinate are applied to the processed rice. The product is allowed to dry and is then packaged. The result is a product having approximately 4 mg of iron per 1 ounce serving.

Example 2

Fortified puffed corn is prepared by mixing 100 pounds of corn flour, 2 pounds of table salt, 2 pounds of starch, 5 grams of FD&C yellow color, 20 pounds of water and 2 pounds of malt syrup. The mixture is conveyed to a cooking extruder where it is extruded to a desired shape. The mixture is dried to lower the moisture from 20% to 10%, tempered and then loaded into a puffing gun where it is pressurized to 200 psi. The firing process is then carried out where the puffed corn is caught and screened to a desirable size. The puffed corn is dispersed in a thin layer where a continuous spray consisting of 10 pounds of water, 3 pounds of dextrose, a 2 ounce vitamin blend and 26 grams of zinc bisglycinate.

Once coated, the puffed corn is dried until the product reaches a 2% moisture level to be packaged. The result is a product having approximately 3 mg of zinc per 1 ounce serving.

Example 3

Fortified puffed rice is prepared by admixing 26 grams of zinc bisglycinate with a 2 ounce vitamin blend and 4 pounds of water forming a solution. 100 pounds of long grain white rice is soaked in the solution for about 1 hour. A puffing gun is preheated to 475° F. and then the soaked rice is loaded into the pressurized puffing gun (200 psi). The firing process is started and the puffed rice is caught and screened to obtain a desirable size. The puffed rice is dried in an oven until the product reaches 2% moisture for packaging. The end result provides a puffed rice product having approximately 3 mg of zinc per 1 ounce serving.

Example 4

Fortified extruded wheat shapes are prepared by mixing 18 pounds of water with 2 pounds of malt syrup to form a slurry. Next, 100 pounds of wheat flour, 10 pounds of table sugar, 2 pounds of table salt, 10 grams of FD&C color, a 2 ounce vitamin blend and 6 pounds of calcium amino acid chelate sold by Albion Labs, Inc. under the trademark CALCIUM TASTE FREE™ are mixed into the slurry. The mixture is then conveyed into a cooking extruder and extruded into appropriate shapes (such as shredded wheat or other common grain shapes) at 17–18% moisture. The product is further conveyed into an oven for toasting at 575° F. for 90 seconds. The product is allowed to cool and then is packaged. The resulting product provides 200 mg of calcium per 1 ounce serving.

Example 5

Fortified toasted corn flakes are prepared by mixing 6 pounds of table sugar, 2 pounds of table salt, a 2 ounce vitamin blend, 35 grams of ferrous bisglycinate with 2 pounds of malt syrup and water to obtain a moisture level of about 32%,. The resulting syrup is mixed with 100 pounds of corn grits and placed in a batch pressure cooker at 15–18 psi for 2 hours. The corn grits are placed onto a conveyer and run under smoothing wheels. The smoothed product is moved into a drier with controlled airflow and humidity at 220–230° F. until the moisture reaches 10–14%. The product is then air cooled until it reaches ambient temperature where it is tempered for an additional 3 hours. The paste or dough is then rolled into a thin layer and toasted at 575° F. for 90 seconds. Once removed, the toasted dough is cooled and flaked to an appropriate size in preparation for packaging. The end result provides a toasted corn flake product having approximately 4 mg of iron per 1 ounce serving.

While the invention has been described with reference to certain preferred embodiments, those skilled in the art will appreciate that various modifications, changes, omissions, and substitutions can be made without departing from the spirit of the invention. For example, a similar procedure could be applied to other types of processed cereal pieces not mentioned in the examples but mentioned in the claims and specification. It is intended, therefore, that the invention be limited only by the scope of the following claims.

We claim:

1. A processed cereal piece fortified with a metal amino acid chelate, wherein the amino acid portion of said chelate is made up of naturally occurring amino acids said metal amino acid chelate having a ligand to metal mole ratio from 1:1 to 4:1, and wherein said metal amino acid chelate is present as an integrated component of said processed cereal piece.

2. A fortified processed cereal piece as in claim 1 wherein said metal is selected from the group consisting of iron, calcium, magnesium, zinc, copper, manganese and chromium.

3. A fortified processed cereal piece as in claim 2 wherein said ligand is an amino acid selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and dipeptides, tripeptides and tetrapeptides formed by any combination of said amino acids thereof.

4. A fortified processed cereal piece as in claim 3 wherein said metal is present at from about 0.001% to 2% by weight.

5. A fortified processed cereal piece as in claim 4 wherein said processed cereal piece is selected from the group consisting of flaked pieces, puffed cereal grain kernels, puffed dough pieces, extruded dough pieces, baked pieces, nuggets and rolled grain pieces.

6. A fortified processed cereal piece as in claim 4 wherein said piece is fortified by coating said processed cereal piece with said metal amino acid chelate.

7. A fortified processed cereal piece as in claim 4 wherein said piece is fortified by incorporating said metal amino acid chelate throughout said processed cereal piece prior to cooking.

8. A fortified processed cereal piece as in claim 4 wherein said piece is fortified by soaking said processed cereal piece in an aqueous solution containing said metal amino acid chelate.

9. A fortified processed cereal piece as in claim 4 wherein said ligand is glycine.

10. A fortified processed cereal piece as in claim 9 wherein said metal is calcium.

11. A fortified processed cereal piece as in claim 10 wherein said calcium is present from about 0.05% to 2% by weight.

12. A fortified processed cereal piece as in claim 11 wherein said metal amino acid chelate is calcium bisglycinate.

13. A fortified processed cereal piece as in claim 9 wherein said metal is zinc.

14. A fortified processed cereal piece as in claim 13 wherein said zinc is present from about 0.001% to 0.1% by weight.

15. A fortified processed cereal piece as in claim 14 wherein said metal amino acid chelate is zinc bisglycinate.

16. A fortified processed cereal piece as in claim 9 wherein said metal is iron.

17. A fortified processed cereal piece as in claim 16 wherein said iron is present from about 0.001% to 0.1% by weight.

18. A fortified processed cereal piece as in claim 17 wherein said metal amino acid chelate is ferrous bisglycinate.

19. A fortified processed cereal piece as in claim 17 wherein said metal amino acid chelate is ferric trisglycinate.

20. A method of fortifying a processed cereal piece with a metal amino acid chelate comprising the steps of:

providing a metal amino acid chelate wherein the amino acid portion of said chelate is made up of naturally occurring amino acids and wherein the ligand to metal mole ratio is from 1:1 to 4:1; and Integrating a known amount of said metal amino acid chelate with said cereal piece.

21. A method of fortifying a processed cereal piece as in claim 20 wherein said metal is selected from the group consisting of iron, calcium, magnesium, zinc, copper, manganese and chromium.

22. A method of fortifying a processed cereal piece as in claim 21 wherein said ligand is an amino acid selected from the group of consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and dipeptides, tripeptides and tetrapeptides formed by any combination of said amino acids thereof.

23. A method of fortifying a processed cereal piece as in claim 22 wherein the step of integrating further comprises the steps of:

mixing said metal amino acid chelate in a liquid carrier solution;

coating said processed cereal piece with said liquid carrier solution; and drying said processed cereal piece.

24. A method of fortifying a processed cereal piece as in claim 23 wherein said step of coating comprises spraying said processed cereal piece with said liquid carrier solution.

25. A method of fortifying a processed cereal piece as in claim 23 wherein said step of coating comprises brushing said processed cereal piece with said liquid carrier solution.

26. A method of fortifying a processed cereal piece as in claim 23 wherein said step of coating comprises immersing said processed cereal piece with said liquid carrier solution.

27. A method of fortifying a processed cereal piece as in claim 23 wherein said ligand is glycine.

28. A method of fortifying a processed cereal piece as in claim 27 wherein said metal is iron.

29. A method of fortifying a processed cereal piece as in claim 28 wherein said metal amino acid chelate is ferrous bisglycinate.

30. A method of fortifying a processed cereal piece as in claim 28 wherein said metal amino acid chelate is ferric trisglycinate.

31. A method of fortifying a processed cereal piece as in claim 27 wherein said metal is calcium.

32. A method of fortifying a processed cereal piece as in claim 31 wherein said metal amino acid chelate is calcium bisglycinate.

33. A method of fortifying a processed cereal piece as in claim 27 wherein said metal is zinc.

34. A method of fortifying a processed cereal piece as in claim 33 wherein said metal amino acid chelate is zinc bisglycinate.

35. A method of fortifying a processed cereal piece as in claim 23 wherein said processed cereal piece is selected from the group consisting of flaked pieces, puffed cereal grain kernels, puffed dough pieces, extruded dough pieces, baked pieces, nuggets and rolled grain pieces.

36. A method of fortifying a processed cereal piece as in claim 22 wherein said step of integrating comprises the steps of:

providing a cereal grain kernel;

gelatinizing said cereal grain kernel under heat and pressure in the presence of said metal amino acid chelate; and releasing said pressure to form a puffed cereal kernel, wherein said puffed cereal grain kernel is integrated with said metal amino acid chelate.

37. A method of fortifying a processed cereal piece as in claim 36 wherein said ligand is glycine.

38. A method of fortifying a processed cereal piece as in claim 37 wherein said metal is iron.

39. A method of fortifying a processed cereal piece as in claim 38 wherein said metal amino acid chelate is ferrous bisglycinate.

40. A method of fortifying a processed cereal piece as in claim 38 wherein said metal amino acid chelate is ferric trisglycinate.

41. A method of fortifying a processed cereal piece as in claim 37 wherein said metal is calcium.

42. A method of fortifying a processed cereal piece as in claim 41 wherein said metal amino acid chelate is calcium bisglycinate.

43. A method of fortifying a processed cereal piece as in claim 37 wherein said metal is zinc.

44. A method of fortifying a processed cereal piece as in claim 43 wherein said metal amino acid chelate is zinc bisglycinate.

45. A method of fortifying a processed cereal piece as in claim 22 wherein an additional step of preparing said processed cereal piece for consumption comprises the steps of premixing a group of fortified processed cereal pieces with a group of unfortified processed cereal pieces at a ratio that will provide a predetermined amount of said metal in a single serving of said processed cereal pieces.

46. A method of fortifying a processed cereal piece as in claim 22 wherein the step of integrating said processed cereal pieces further comprises the steps of:

blending and hydrating raw ingredients including said metal amino acid chelate to form a paste or dough; and drying, toasting or otherwise cooking said paste or dough.

47. A method of fortifying a processed cereal piece as in claim 46 wherein said metal amino acid chelate is admixed with said raw ingredients prior to hydrating said raw ingredients.

48. A method of fortifying a processed cereal piece as in claim 46 wherein said metal amino acid chelate is admixed with said paste or dough after said raw ingredients are hydrated.

49. A method of fortifying a processed cereal piece as in claim 46 wherein said paste or dough is shaped and sized.

50. A method of fortifying a processed cereal piece as in claim 46 wherein said dried, toasted or otherwise cooked paste or dough is shaped and sized.

51. A method of fortifying a processed cereal piece as in claim 46 wherein said ligand is glycine.

52. A method of fortifying a processed cereal piece as in claim 51 wherein said metal is iron.

53. A method of fortifying a processed cereal piece as in claim 52 wherein said metal amino acid chelate is ferrous bisglycinate.

54. A method of fortifying a processed cereal piece as in claim 52 wherein said metal amino acid chelate is ferric trisglycinate.

55. A method of fortifying a processed cereal piece as in claim 51 wherein said metal is calcium.

56. A method of fortifying a processed cereal piece as in claim 55 wherein said metal amino acid chelate is calcium bisglycinate.

57. A method of fortifying a processed cereal piece as in claim 51 wherein said metal is zinc.

58. A method of fortifying a processed cereal piece as in claim 57 wherein said metal amino acid chelate is zinc bisglycinate.

59. A method of fortifying a processed cereal piece as in claim 46 wherein said processed cereal piece is selected from the group consisting of flaked pieces, puffed dough pieces, extruded dough pieces, baked pieces and nuggets.

* * * * *